(12) United States Patent
Kwon

(10) Patent No.: US 7,007,929 B2
(45) Date of Patent: Mar. 7, 2006

(54) ELECTRIC WIRE REMOVING ROLLER FOR LP INSULATOR AND POWER DISTRIBUTION METHOD OF CONSTRUCTION

(75) Inventor: Sae-Won Kwon, Choongchungbuk-Do (KR)

(73) Assignee: Daewon Electric Co. Ltd., Choongchungbuk-Do (KR)

( * ) Notice: Subject to any disclaimer, the term of this patent is extended or adjusted under 35 U.S.C. 154(b) by 0 days.

(21) Appl. No.: 10/479,895
(22) PCT Filed: Jun. 1, 2002
(86) PCT No.: PCT/KR02/01043
§ 371 (c)(1),
(2), (4) Date: Dec. 2, 2003
(87) PCT Pub. No.: WO02/103870
PCT Pub. Date: Dec. 27, 2002

(65) Prior Publication Data
US 2004/0149970 A1   Aug. 5, 2004

(30) Foreign Application Priority Data
Jun. 2, 2001  (KR) ......................................... 2001-30953

(51) Int. Cl.
B66D 3/08 (2006.01)
B65H 59/00 (2006.01)
B65H 57/00 (2006.01)

(52) U.S. Cl. ................ 254/395; 242/615.2; 242/157 R; 242/615.3; 226/190; 226/196; 254/134.3 PA; 254/134.3 R

(58) Field of Classification Search ............. 242/615.2, 242/615.3, 157 R; 226/190, 196; 254/134.3 PA, 254/134.3 R, 134.3 CL, 395

See application file for complete search history.

(56) References Cited

U.S. PATENT DOCUMENTS

| | | | | |
|---|---|---|---|---|
| 2,946,559 A | * | 7/1960 | Pickett | ............... 254/134.3 PA |
| 3,918,685 A | * | 11/1975 | Lindsey et al. | ..... 254/134.3 PA |
| 5,573,226 A | * | 11/1996 | Smith | ......................... 254/395 |
| 5,599,005 A | * | 2/1997 | Sauber | ............... 254/134.3 PA |
| 6,517,052 B1 | * | 2/2003 | Lake | .................. 254/134.3 PA |

FOREIGN PATENT DOCUMENTS

FR          2593332 A1 *  7/1987

* cited by examiner

Primary Examiner—Kathy Matecki
Assistant Examiner—E. Langdon
(74) Attorney, Agent, or Firm—GWiPS

(57) ABSTRACT

The present invention discloses a wire stranding roller and a new method for the same, in a LP insulator being mounted at a cross arm of pin long column and insulating and supporting a high voltage wire, which drastically improves workability and greatly reduces construction cost because the location of a wire don't need to be changed after the stranding and wire pulling, which is easy to work with and is very effective in reducing labor cost and preventing a safety accident because it can easily perform wiring and removing works no matter how large the weight of the wires would be, which is capable of precisely adjusting a dip (degree in which the wire hangs down) because the wire are placed on an insulator, which is to be mounted, during a wire pulling work and also which can solve the problem of securing a work space when carrying out the work applying and uninterruptible method by forming a open-and-shut roller capable of wire insertion and a wire stranding roller consisting of an insulator coupling opening and directly coupling them on the upper surface of the LP insulator.

6 Claims, 6 Drawing Sheets

ELECTRIC WIRE REMOVING ROLLER FOR LP INSULATOR AND POWER DISTRIBUTION METHOD OF CONSTRUCTION

BACKGROUND OF THE INVENTION

1. Field of the Invention

The present invention relates to a wire stranding roller for a LP insulator and a wire distribution method using the same, in a LP insulator being mounted on a cross arm of pin long column and insulating and supporting a high voltage wire, which is to be used for a wire stranding work (work for elongating a wire) or a wire pulling work (work for stretching a wire tight) at an upper surface of the LP insulator when mounting, removing or replacing the wire.

2. Related Prior Art

A previous wire stranding roller used in a distribution line electric work is devised such that it is mounted on a cross arm to prevent the damage of wires during a wire stranding work and make the wire stranding work easier. It is easily detachable from the cross arm and can be fixed firmly thereto. By allowing the wire stranding roller to be opened and closed easily, the upper portion thereof can be opened and closed so as to make it easier the installation of a rope for wire stranding during a wiring work and the installation and removal of a wire. In the wire stranding roller, rollers are formed to avoid friction during the movement of a wire or a rope. At the lower portion, as shown in FIGS. 6a to 6c, the wire stranding roller is constructed to be detached from, not a LP insulator but the cross arm of a separate position.

However, in the previous wire stranding roller with a cross arm, a wire is stranded to the wire stranding roller during wire stranding of both wiring work and wire removing work. Therefore, to install a new wire, once wire stranding and pulling works are finished, the wire is moved from the wire stranding roller to the installation position of the upper portion of the LP insulator and then is bound and fixed to the upper portion of the LP insulator.

A wire removing work is performed after removing a bind from the upper portion of the LP insulator and moving it to the wire stranding roller.

At this time, when performing the work of moving the newly installed wire from the wire stranding roller to the upper portion of the LP insulator and in the work of moving a remove wire from the upper portion of the LP insulator to the wire stranding roller and installing it, this is very ineffective and needs a lot of labor cost. Further, even a distribution line worker who is skilled at a column of a high mast may be at a dangerous state.

As the industrial society develops, a large capacity of power and a heavy and thick wire are required. This makes it difficult to move a wire from the wire stranding roller to an extra high voltage insulator and install it by a human power. Also, it makes impossible the movement and installation using a human force when an one-direction install type long column, not a standard long column, is used.

Further, when carrying out a wiring work applying an uninterruptible method, there occurs a problem in securing a work space for installing the wire stranding roller to the cross arm.

SUMMARY OF THE INVENTION

Therefore, it is an object of the present invention to provide wire stranding roller for a LP insulator and a wire distribution method using the same, which drastically improves workability and greatly reduces construction cost because the location of a wire don't need to be changed after the stranding and wire pulling, which is easy to work with and is very effective in reducing labor cost and preventing a safety accident because it can easily perform wiring and removing works no matter how large the weight of the wires would be, which is capable of precisely adjusting a dip (degree in which the wire hangs down) because the wire are placed on an insulator, which is to be mounted, during a wire pulling work and also which can solve the problem of securing a work space when carrying out the work applying and uninterruptible method by forming a open-and-shut roller capable of wire insertion and a wire stranding roller consisting of an insulator coupling opening and directly coupling them to the upper surface of the LP insulator.

DETAILED DESCRIPTION OF THE PREFERRED EMBODIMENT

A preferred embodiment of the present invention will now be described with reference to the accompanying drawings.

Figure 1:
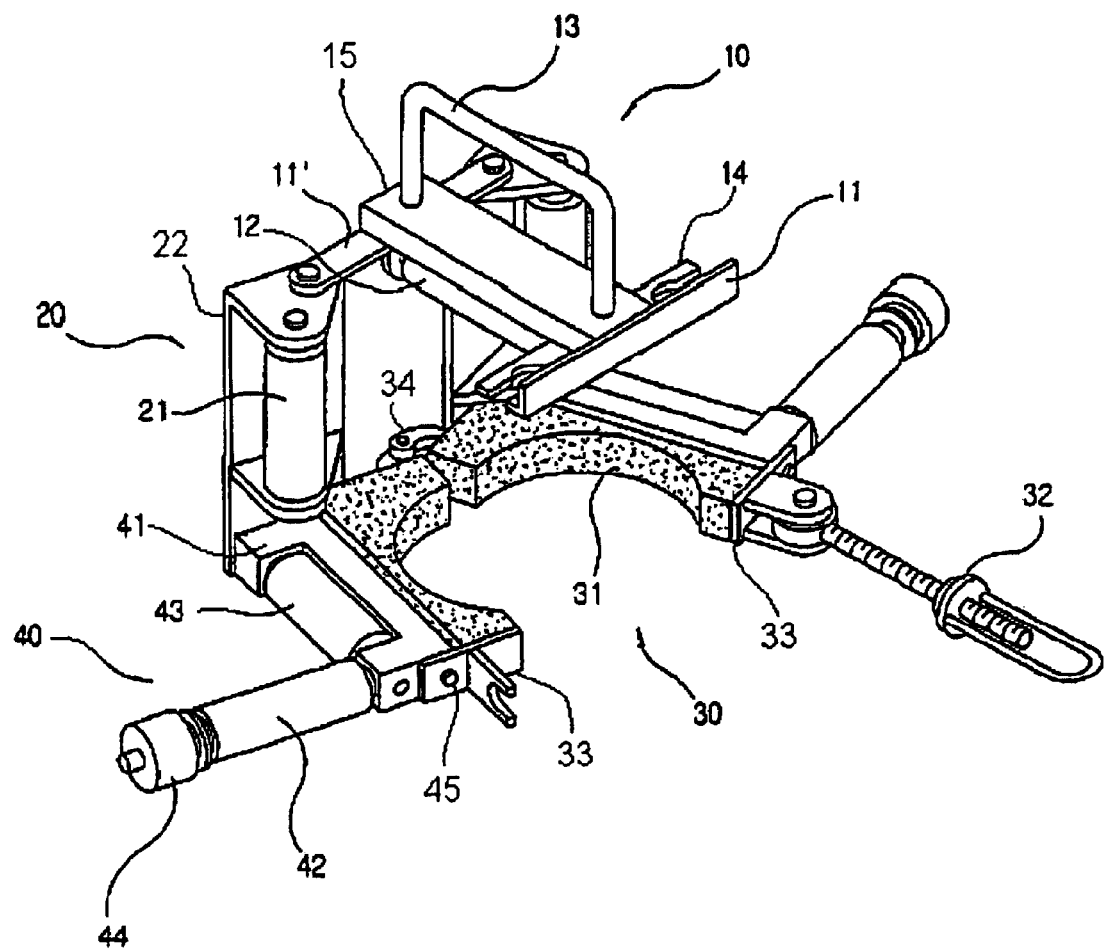
FIG. 1 is an overall perspective view of a wire stranding roller according to the present invention when it is opened.
Figure 2:
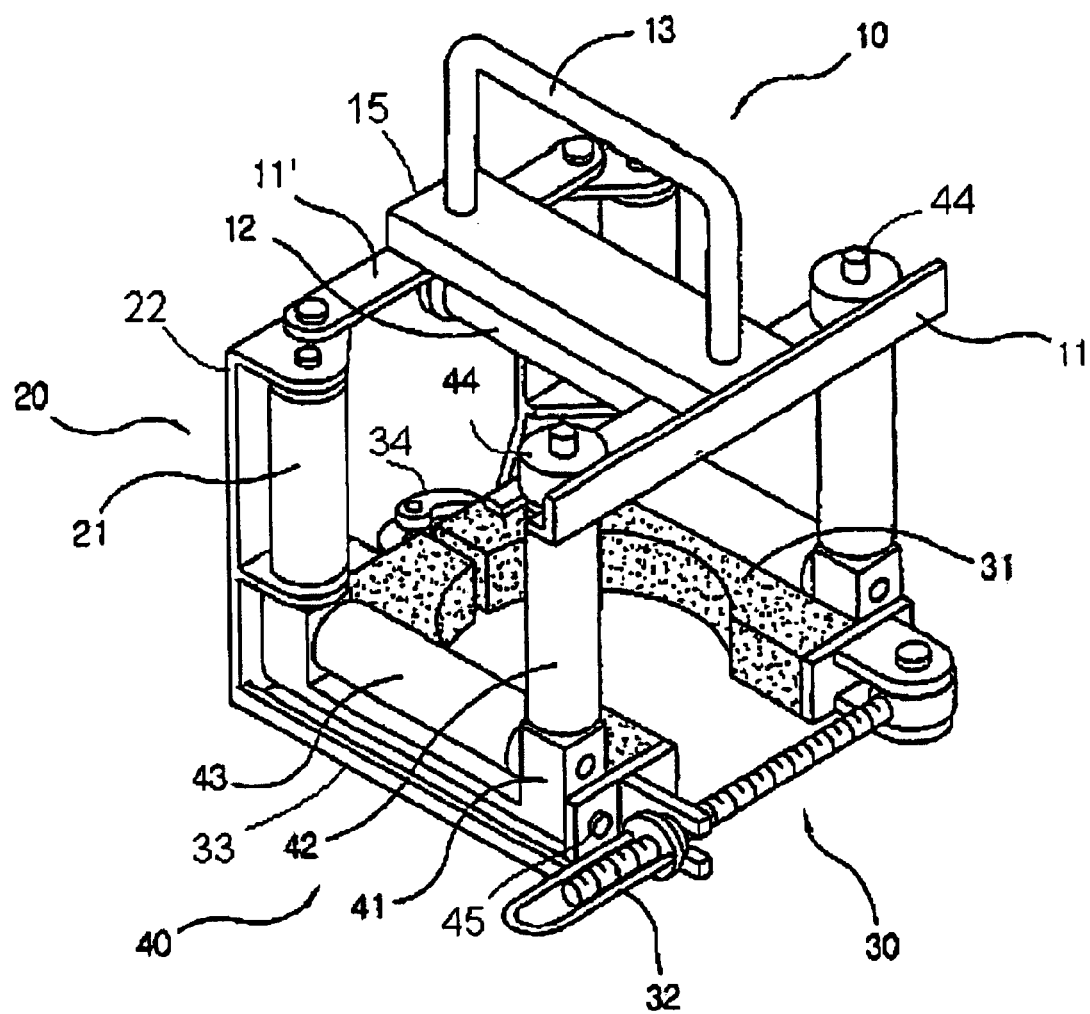
FIG. 2 is a perspective view of the wire stranding roller according to the present invention when it is closed.

FIG. 1 is an overall perspective view of a wire stranding roller according to the present invention when it is opened; and FIG. 2 is a perspective view of the wire stranding roller according to the present invention when it is closed.

The wire stranding roller for a LP insulator is comprised of: an upper supporting unit 10 having a front supporting bracket 11, a rear supporting bracket 11', a cross beam 15 transversely fixed between the front and rear supporting brackets 11 and 11', an upper roller 12 axially and rotationally mounted underneath the cross beam 15 and a handle 13 fixed on top of the cross beam 15; a pair of left and right vertical supporting units 20, each vertical supporting unit 20 having a vertical rear bracket 22, and a vertical rear roller 21 axially and rotationally mounted in the vertical rear bracket 22, the left and right vertical rear brackets 22 are symmetrically formed each other and hinged by the rear supporting bracket 11' at its close top corner; an insulator coupling unit 30 having a pair of symmetrically formed left and right base frames 33, each base frame 33 formed integrally and perpendicular to the vertical rear bracket 22, a pair of symmetrically split half insulator pad 31 with a semi-circular center cut out, each split half insulator pad 31 installed inside of each base frame 33, a rear hinge 34 for hinging the symmetrically formed left and right base frames 33 at the rear, and a screw-type clamp 32 attached at the front for clamping; and a pair of left and right open-and-shut units 40, each open-and-shut unit 40 having a roller supporting beam 41 axially and rotationally hinged inside the base frame 33, a base roller 43 axially and rotationally mounted inside the roller supporting beam 41, and a front roller 42 axially and rotationally mounted perpendicular to the roller supporting beam 41, so that the left and right open-and-shut units 40 are able to outwardly rotate with respect to their axis 45 of roller supporting beams 41 for a-latching or unlatching to the front supporting bracket 11. The front supporting bracket 11 has a pair of one end opened latch holes 14 symmetrically formed at its both ends for latching the open-and-shut unit 40.

In addition, a wire distribution method using the wire stranding roller of the present invention will now be explained by steps.

The wire deployment method comprises the steps of: mounting an insulator coupling unit 30 of a wire stranding roller on a top portion of a LP insulator; opening a pair of left and right open-and-shut units 40 of the wire stranding roller by bilaterally rotating the left and right front rollers 42 for laterally inserting a wire thereinto; confining the inserted wire in a room of the wire stranding roller by reverse-rotating the left and right front rollers 42, simultaneously the inserted wire gradually lifted upward by the base rollers 43 for providing a sufficient clearance between the inserted wire and the top surface of the LP insulator; stranding and pulling the wire that provides a sufficient clearance between the bottom of the wire and the top of the LP insulator for freely movable state by the rollers; supporting the pulled wire and lowering the base roller 43 by bilaterally rotating the left and right front rollers 42 again for binding the pulled wire on the upper surface of the LP insulator, and removing the wire stranding roller from the LP insulator.

Hereinafter, the operation of the constructed wire stranding roller is described in detail.

When the wire stranding roller of the present invention is mounted on top of the LP insulator, the left and right base frames 33 disposed at the lower portion of the wire stranding roller is bilaterally opened and positioned on top of the LP insulator. At this moment, the insulator pad 31 installed inside of the base frames 33 is properly seated on top of the LP insulator. Then, the left and right base frames 33 of the insulator coupling unit 30 are reversed to firmly close and clamp the screw-type clamp 32 disposed at the front surface. Since the insulator pad 31 is made of soft plastic material, such as an insulating material, it can cut off the current of the wire and prevent damage to the LP insulator when it is mounted.

Figure 3:
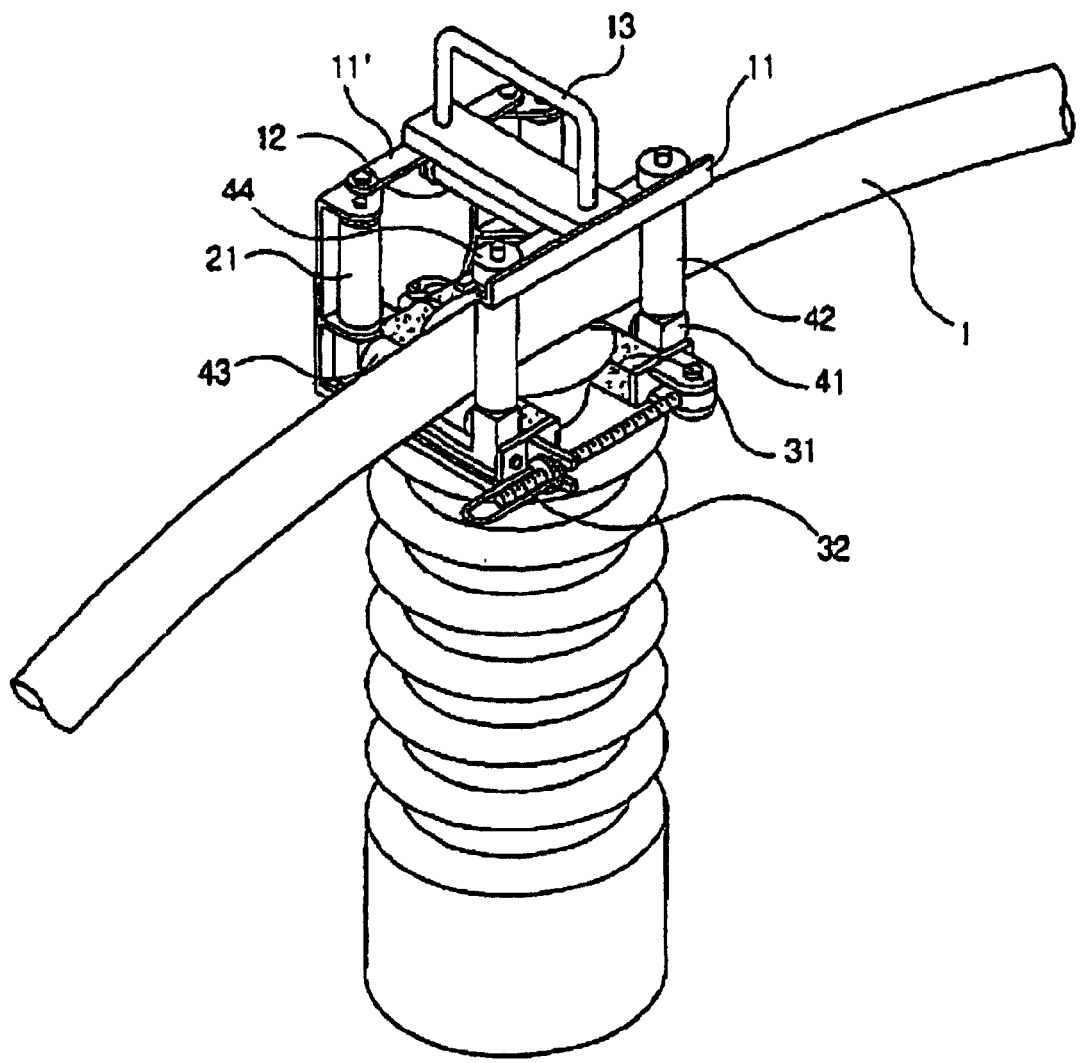
FIG. 3 is a perspective view of the wire stranding roller according to the present invention when it is used.
Figure 4:
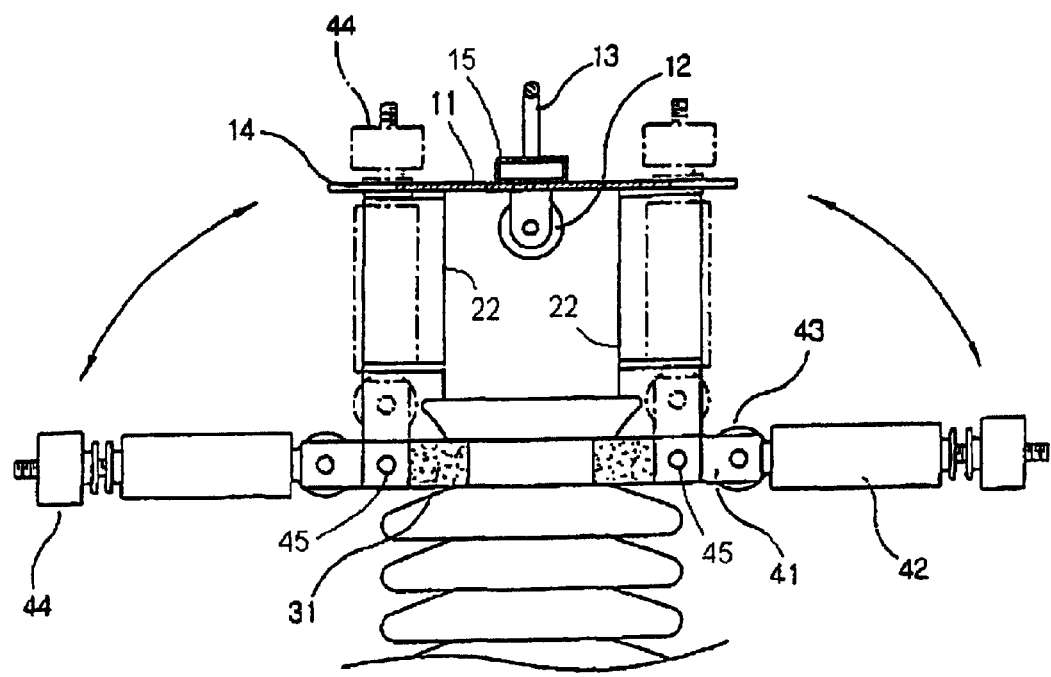
FIG. 4 is a front view of the wire stranding roller according to the present invention when it is used.
Figure 5A:
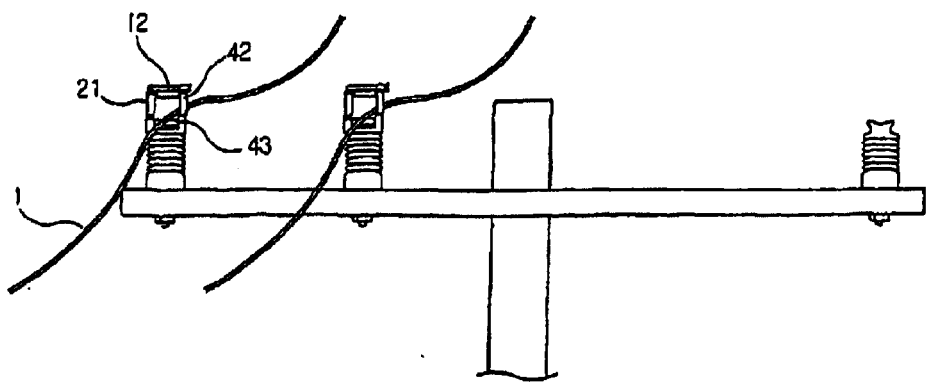
FIGS. 5a to 5c are schematic side views of the wire stranding roller according to the present invention during a wire distribution process.
Figure 5B:
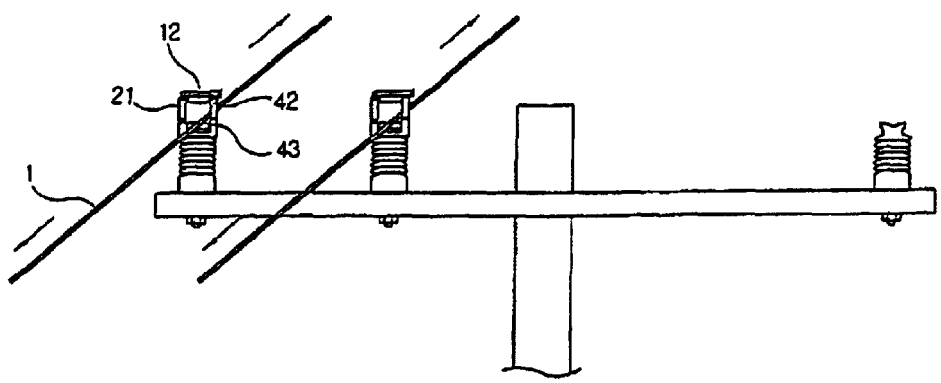
Figure 5C:
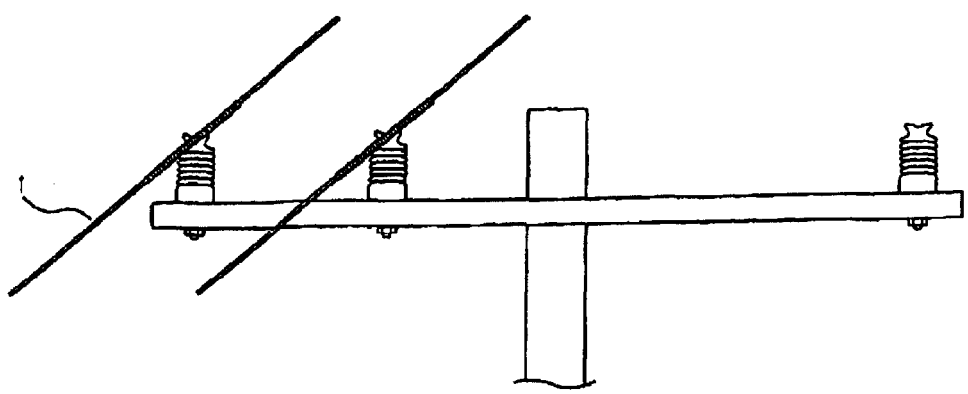
Figure 6A:
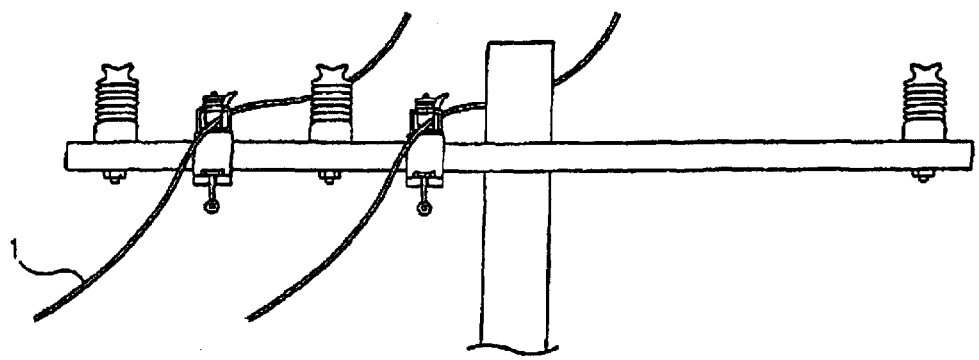
FIGS. 6a to 6c are schematic side views of a previous wire stranding roller during a wire distribution process.
Figure 6B:
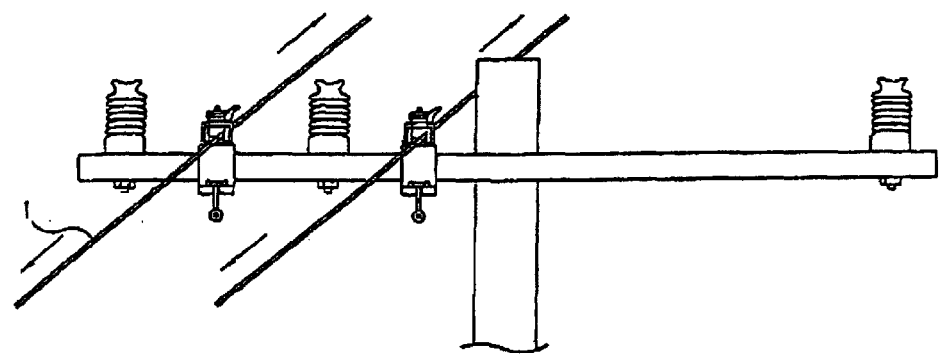
Figure 6C:
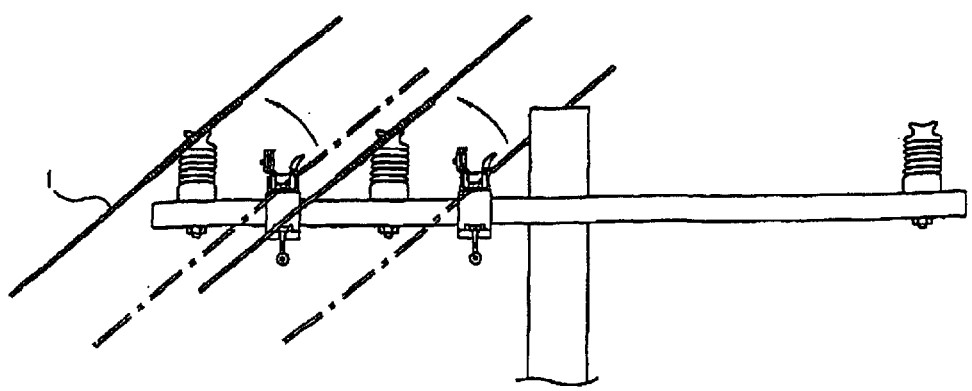

With respect to the wire stranding roller mounted on top of the LP insulator, first, the left and right front rollers 42 which are integrally installed perpendicular to the left and right roller supporting beams 41 forming L-shaped open-and-shut units 40 are bilaterally rotated with respect to their axis 45 of the roller supporting beams 41 to open and make a room for laterally inserting the wire. In this state, a wire to be installed is inserted into the provided room of the wire stranding roller to be positioned above the upper portion of the LP insulator and inside the insulator coupling unit 30. Then, the latching member 44 installed at the tip of the front roller 42 is latched into the one end opened latch holes 14 of the front supporting bracket 11 by reverse-rotating the front rollers 42, and secured by the springs. Therefore, as shown in FIG. 3, a wire 1 is confined between the surrounding seven rollers, one upper roller 12, two of vertical rear rollers 21, front rollers 42 and base rollers 43. As shown in FIG. 4, the base rollers 43 installed inside the roller supporting beams 41 are simultaneously rotated with respect to the axis 45 by rotation of L-shaped open-and-shut units 40, thereby the wire 1 is slowly lifted upward.

Therefore, the bottom of the wire 1 is separated from the top of the LP insulator by shifting of the base rollers 43 so that it make the wire 1 movable freely and smoothly. This clearance makes the wire stranding and pulling process easy, convenient and preventing the damage of cables or insulator surfaces.

In this way, when the wire stranding process is completed, the wire is bound to the LP insulator. Then, the latching is released by unlatching the latching members 44 of the front rollers 42 and thereafter the L-shaped open-and-shut units 40 are bilaterally rotated. Then, the left and right base rollers 43 are shifted back by the reverse rotation of L-shaped open-and-shut units 40 to lower the lifted wire 1 for mounting on the upper surface of the LP insulator.

After the mounting, when the clamp 32 is loosened and the wire stranding roller is removed from the insulator, the pulled wire becomes placed on the upper portion of the LP insulator. Thus, in this state, wire placement and the like can be finished after a binding work.

In the conventional art, the wire stranding and pulling works are finished by the wire stranding roller mounted on the cross arm and then are moved to the upper portion of the LP insulator and are installed. However, in the present invention, there is no need to perform a dual repetitive work process of moving a wire from the LP insulator to the stranding roller or moving the wire from the stranding roller to the LP insulator, thus saving labor cost and preventing a safety accident with the slackness of the wire.

As described above, in the present invention, the wire stranding roller with upper, lower, left and right rollers that can be opened and shut is directly placed on the LP insulator when placing a wire on the LP insulator. It drastically improves workability because the location of a wire don't need to be changed after the stranding and wire pulling, it is easy to work with and is very effective in reducing labor cost and it is capable of precisely adjusting a dip.

What is claimed is:

1. A wire stranding roller for a LP insulator, comprising:
an upper supporting unit (10) having a front supporting bracket (11), a rear supporting bracket (11'), a cross beam (15) transversely fixed between said front and rear supporting brackets (11, 11'), an upper roller (12) axially and rotationally mounted underneath said cross beam (15) and a handle (13) fixed on top of said cross beam (15),
a pair of left and right vertical supporting units (20), each vertical supporting unit (20) having a vertical rear bracket (22), and a vertical rear roller (21) axially and rotationally mounted on said vertical rear bracket (22),
an insulator coupling unit (30) having a pair of left and right base frames (33), each base frame (33) formed integrally and perpendicular to said vertical rear bracket (22), a pair of symmetrically split half insulator pads (31) with semi-circular center cut outs, each split half insulator pad (31) installed inside of each base frame (33), a rear hinge (34) for hinging said left and right base frames (33), and a screw-type clamp (32) for clamping said left and right base frames (33), and
a pair of left and right open-and-shut units (40), each open-and-shut unit (40) having a roller supporting beam (41) axially and rotationally hinged inside said base frame (33), a base roller (43) axially and rotationally mounted inside said roller supporting beam (41), and a front roller (42) axially and rotationally mounted perpendicular to said roller supporting beam (41), so that said left and right open-and-shut units (40) are bilaterally rotated with respect to their axis (45) of said roller supporting beams (41) for latching or unlatching to said front supporting bracket (11).

2. A wire stranding roller for a LP insulator as claimed of claim 1, wherein said front supporting bracket (11) has a pair of one end opened latch holes (14) that are symmetrically formed at its both ends for latching said open-and-shut unit (40).

3. A wire stranding roller for a LP insulator as claimed of claim 1, wherein said left and right vertical rear brackets (22) are symmetrically formed each other and hinged by said rear supporting bracket (11') at their close top corner.

4. A wire stranding roller for a LP insulator as claimed of claim 1, wherein said left and right base frames (33) are symmetrically formed each other and hinged at rear by said rear hinge (34) and attached said screw-type clamp (32) at front.

5. A wire stranding roller for a LP insulator as claimed of claim 1, wherein said front roller (42) further comprises a spring and a latching member (44) at its opened tip for latching or unlatching into said front supporting bracket (11).

6. A method of wiring by using a wire stranding roller for a LP insulator, the method comprises the steps of:

mounting an insulator coupling unit (30) of a wire stranding roller on top of a LP insulator, opening a pair of left and right open-and-shut units (40) of the wire stranding roller by bilaterally rotating left and right front rollers (42) and laterally inserting a wire thereinto, confining the inserted wire in a room of the wire stranding roller by reverse-rotating said left and right front rollers (42), simultaneously the inserted wire gradually lifted upward by base rollers (43) for providing a sufficient clearance between bottom of the inserted wire and the top surface of LP insulator, stranding and pulling the wire that is provided the sufficient clearance between the LP insulator and freely movable state by the rollers, supporting the pulled wire and lowering said base roller (43) by bilaterally rotating said left and right front rollers (42) again for binding the pulled wire on the upper surface of LP insulator, and removing the wire stranding roller from the LP insulator.

* * * * *